United States Patent
Murakami et al.

(10) Patent No.: US 8,218,646 B2
(45) Date of Patent: Jul. 10, 2012

(54) MOVING IMAGE ENCODING APPARATUS, MOVING IMAGE ENCODING METHOD, AND PROGRAM

(75) Inventors: Takeshi Murakami, Saitama (JP); Ryuichi Kanda, Saitama (JP)

(73) Assignee: KDDI Corporation, Tokyo (JP)

( * ) Notice: Subject to any disclaimer, the term of this patent is extended or adjusted under 35 U.S.C. 154(b) by 991 days.

(21) Appl. No.: 12/192,275

(22) Filed: Aug. 15, 2008

(65) Prior Publication Data

US 2009/0046780 A1 Feb. 19, 2009

(30) Foreign Application Priority Data

Aug. 15, 2007 (JP) ................................ 2007-211710

(51) Int. Cl.
*H04N 11/02* (2006.01)
(52) U.S. Cl. .............. 375/240.24; 375/240; 375/240.17; 375/240.26; 375/240.28; 348/445; 348/565; 348/584
(58) Field of Classification Search .................. 375/240, 375/240.17, 240.24, 240.25, 240.26, 240.27, 375/240.28; 348/445, 565, 584
See application file for complete search history.

(56) References Cited

U.S. PATENT DOCUMENTS

| 6,005,626 | A * | 12/1999 | Ding ........................ 375/240.16 |
| 6,118,823 | A * | 9/2000 | Carr ......................... 375/240.28 |
| 6,356,589 | B1 * | 3/2002 | Gebler et al. ............. 375/240.1 |
| 6,509,929 | B1 * | 1/2003 | Ishikawa ................... 348/405.1 |
| 7,079,697 | B2 * | 7/2006 | Zhou ............................. 382/250 |
| 7,277,483 | B1 * | 10/2007 | Eckart ...................... 375/240.03 |
| 7,426,308 | B2 * | 9/2008 | Hsu et al. ...................... 382/239 |
| 7,532,808 | B2 * | 5/2009 | Lainema ........................ 386/328 |
| 7,869,503 | B2 * | 1/2011 | Haskell et al. ............ 375/240.03 |
| 2003/0012278 | A1 * | 1/2003 | Banerji et al. ........... 375/240.12 |
| 2005/0013497 | A1 * | 1/2005 | Hsu et al. ...................... 382/239 |
| 2005/0175091 | A1 * | 8/2005 | Puri et al. ................. 375/240.03 |
| 2005/0249279 | A1 * | 11/2005 | Kondo et al. ............. 375/240.03 |

(Continued)

FOREIGN PATENT DOCUMENTS

JP 3-3479 1/1991

(Continued)

OTHER PUBLICATIONS

Office Action issued in Japanese Patent Application No. 2007-211710 on May 10, 2011.

*Primary Examiner* — Ayaz Sheikh
*Assistant Examiner* — Andrew C Lee
(74) *Attorney, Agent, or Firm* — Antonelli, Terry, Stout & Kraus, LLP.

(57) ABSTRACT

A moving image encoding apparatus includes a first-step encoding section for executing a plurality of times first-step encoding by use of different quantization control variables; a code-amount estimation section for estimating, for all the quantization control variables, an amount of codes generated for each frame by making use of a plurality of results of the encoding; a code-amount allocation section for allocating an amount of codes for each frame on the basis of results of the estimation; and a second-step encoding section for executing second-step encoding on the basis of the amount of codes allocated to each frame. The first-step encoding section changes the number of times of execution of the encoding in accordance with the attribute of each frame, and omits a portion of processes contained in the coding process in the second and subsequent executions of the encoding process.

9 Claims, 8 Drawing Sheets

U.S. PATENT DOCUMENTS

| | | | |
|---|---|---|---|
| 2006/0067406 A1* | 3/2006 | Kitada et al. | 375/240.16 |
| 2006/0245496 A1* | 11/2006 | Chen | 375/240.16 |
| 2007/0098073 A1* | 5/2007 | Maeda | 375/240.16 |
| 2010/0166061 A1* | 7/2010 | Kondo et al. | 375/240.03 |

FOREIGN PATENT DOCUMENTS

| | | |
|---|---|---|
| JP | 8-186821 | 7/1996 |
| JP | 8-340531 | 12/1996 |
| JP | 2003-18603 | 1/2003 |
| JP | 2007-28156 | 2/2007 |

* cited by examiner

| CONTENT NO. | INPUT IMAGE | | | PROCESSING TIME [sec] | | | | | | | NEW SCHEME/ CONVENTIONAL SCHEME |
|---|---|---|---|---|---|---|---|---|---|---|---|
| | | | | CONVENTIONAL SCHEME | | | | NEW SCHEME | | | |
| | SIZE | NUMBER OF FRAMES | | FIRST-STEP ENCODING | SECOND-STEP ENCODING | Total | | FIRST-STEP ENCODING | SECOND-STEP ENCODING | Total | |
| 1. Coast guard | QCIF(176×144) | 300 | | 1.75 | 1.688 | 3.438 | | 3.172 | 1.922 | 5.094 | |
| | | | | 1.812 | 1.704 | 3.516 | | 3.157 | 1.921 | 5.078 | |
| | | | | 1.75 | 1.672 | 3.422 | | 3.171 | 1.907 | 5.078 | |
| | | | | 1.735 | 1.672 | 3.407 | | 3.172 | 1.906 | 5.078 | |
| | | | | 1.75 | 1.672 | 3.422 | | 3.156 | 1.922 | 5.078 | |
| | | AVERAGE | | 1.759 | 1.682 | 3.441 | | 3.166 | 1.916 | 5.081 | 1.476063761 |
| 2. Container | QVGA(320×240) | 300 | | 4 | 4.266 | 8.266 | | 7.281 | 4.359 | 11.640 | |
| | | | | 4.016 | 4.265 | 8.281 | | 7.266 | 4.344 | 11.610 | |
| | | | | 3.984 | 4.266 | 8.250 | | 7.313 | 4.344 | 11.657 | |
| | | | | 3.985 | 4.266 | 8.251 | | 7.297 | 4.344 | 11.641 | |
| | | | | 4 | 4.282 | 8.282 | | 7.265 | 4.36 | 11.625 | |
| | | AVERAGE | | 3.997 | 4.269 | 8.266 | | 7.2844 | 4.3502 | 11.6346 | 1.4075248 |
| 3. Mobile & Calendar | CIF(352×288) | 300 | | 7.781 | 7.297 | 15.078 | | 13.672 | 7.375 | 21.047 | |
| | | | | 7.86 | 7.375 | 15.235 | | 13.657 | 7.375 | 21.032 | |
| | | | | 7.781 | 7.729 | 15.510 | | 13.841 | 7.359 | 21.000 | |
| | | | | 7.797 | 7.313 | 15.110 | | 13.64 | 7.375 | 21.015 | |
| | | | | 7.766 | 7.297 | 15.063 | | 13.688 | 7.375 | 21.063 | |
| | | AVERAGE | | 7.797 | 7.4022 | 15.1992 | | 13.6596 | 7.3718 | 21.0314 | 1.383717564 |
| 4. Susie | 720×480 | 300 | | 19.094 | 18.734 | 37.828 | | 34.406 | 19.313 | 53.719 | |
| | | | | 19.078 | 18.734 | 37.812 | | 34.375 | 19.313 | 53.688 | |
| | | | | 19.063 | 18.719 | 37.782 | | 34.421 | 19.313 | 53.734 | |
| | | | | 19.047 | 18.766 | 37.813 | | 34.453 | 19.312 | 53.765 | |
| | | | | 19.063 | 18.718 | 37.781 | | 34.375 | 19.297 | 53.672 | |
| | | AVERAGE | | 19.069 | 18.7342 | 37.8032 | | 34.406 | 19.3096 | 53.7156 | 1.420027329 |
| 5. Foreman | SQCIF(128×96) | 300 | | 0.922 | 0.922 | 1.844 | | 1.532 | 0.937 | 2.469 | |
| | | | | 0.938 | 0.921 | 1.859 | | 1.547 | 0.922 | 2.469 | |
| | | | | 0.937 | 0.922 | 1.859 | | 1.547 | 0.938 | 2.485 | |
| | | | | 0.922 | 0.922 | 1.844 | | 1.547 | 0.937 | 2.484 | |
| | | | | 0.937 | 0.922 | 1.859 | | 1.547 | 0.937 | 2.484 | |
| | | AVERAGE | | 0.8312 | 0.9218 | 1.853 | | 1.544 | 0.9342 | 2.4782 | 1.337308813 |
| | | | | | | | | | | AVERAGE OF NEW SCHEME/ CONVENTIONAL SCHEME | 1.405246453 |

MOVING IMAGE ENCODING APPARATUS, MOVING IMAGE ENCODING METHOD, AND PROGRAM

CROSS-REFERENCE TO RELATED APPLICATION

This application claims all benefits accruing under 35 USC §119 from Japanese Application No. 2007-211710, filed Aug. 15, 2007, in the Japanese Patent Office, the disclosure of which is incorporated by reference herein.

BACKGROUND OF THE INVENTION

1. Field of the Invention

The present invention relates to a moving image encoding apparatus, a moving image encoding method, and a program which carry out two-step encoding such that the nature of an image to be encoded is analyzed on the basis of results of first-step encoding, and second-step encoding is carried out on the basis of results of the analysis.

2. Description of the Related Art

Techniques for encoding moving images have progressed together with the international standardization work. The reason for the standardization is that interoperability of decoding processing is needed in order to widely distribute encoded moving image contents. Currently, there exist various standard schemes such as MPEG (Moving Picture Experts Group)-1, MPEG-2, MPEG-4, and H. 264/AVC (Advanced Video Coding). Rules determined by these standard schemes are intended to secure the minimum interoperability for decoding processing, and there remains room for technical competition associated with realization of the standard schemes. Accordingly, many engineers conduct research and developments for, for example, shortening processing time and improving image quality.

For example, in order to mainly improve image quality, various schemes for performing two-step encoding have been proposed (see Patent Documents 1, 2, and 3).

In the scheme disclosed in Patent Document 1, statistical data are obtained for each frame through first-step encoding, frame-by-frame code-amount allocation for improving image quality is performed over the entire sequence of a moving image on the basis of the statistical data, and second-step encoding is performed in accordance with a variable bit rate.

In the scheme disclosed in Patent Document 2, first-step encoding is performed by use of a single quantization scale, and frame-by-frame code-amount allocation is performed on the basis of so-called complexity index data represented by, for example, the product of the quantization scale and the amount of generated codes.

In the scheme disclosed in Patent Document 3, by making use of a sample of statistical data obtained through first-step encoding performed by use of an appropriate quantization scale, and the amounts of codes generated by use of all other quantization scales (=quantization scales not used in the first-step encoding) are estimated by an approximated equation of an exponential function or a higher-order function. Subsequently, on the basis of the estimation result, frame-by-frame code-amount allocation is performed such that designated parameter conditions, such as a bit rate, are satisfied and image quality is improved to the greatest extent, and second-step encoding is performed.

Patent Document 1: Japanese Patent Application Laid-Open (kokai) No. H8-186821

Patent Document 2: Japanese Patent Application Laid-Open (kokai) No. 2003-18603

Patent Document 3: Japanese Patent Application Laid-Open (kokai) No. 2007-28156

However, Patent Document 1 merely contains, as a concrete example of optimal code-amount allocation, a graph showing a desired result (FIG. 6 of Patent Document 1) and a description "The optimal code-amount allocation is realized by performing code-amount allocation in accordance with the complexity of an input image in order to obtain a stable image within a range which satisfies the limitations of buffering and the maximum rate of a transmission line" (Paragraph No. 0038 of Patent Document 1). Therefore, Patent Document 1 cannot be said to describe a concrete operation of a moving image encoding apparatus for code-amount estimation.

In the scheme of Patent Document 2, the first-step encoding is performed only one time; that is, only one quantization scale is used, and only one set of statistical data (=the amount of codes generated through the first-step encoding) is used for the code-amount allocation processing. Therefore, the accuracy of the so-called complexity index data cannot be said to be sufficient, and the code-amount allocation cannot be performed properly.

In the scheme of Patent Document 3, as a concrete example of an approximated equation, there is used an equation in which the amount of codes is determined depending on the reciprocal of a quantization scale (Paragraph No. 0031 of Patent Document 3). Patent Document 3 describes that "In the first encoding, encoding is performed for each frame by use of a fixed quantization scale, the amount of codes generated for each frame is separated into a portion which is affected by the quantization and a portion (e.g., header) which is not affected by the quantization before being totaled . . . " (Paragraph No. 0033 of Patent Document 3). That is, in the scheme of Patent Document 3, since the first encoding is performed for each frame by use of a fixed quantization scale, as in the case of the scheme of Patent Document 2, only statistical data for one quantization scale can be obtained for each frame. The above-described concrete example of the approximated equation contains only one coefficient which is determined with influence of the quantization. Therefore, the equation can be determined on the basis of only the statistical data for one quantization scale. However, since the model of the approximated equation itself cannot cope with various natures of images, the accuracy of generated code amount estimation cannot be said to be sufficient. Therefore, code amount allocation cannot be performed properly.

As described above, the conventional techniques described in Patent Documents 1 to 3 cannot properly perform code amount allocation, and cannot improve image quality.

Notably, a quantization scale is a value which defines coarseness of quantization. When the quantization scale is large, the compression efficiency increases although the amount of information lost through quantization increases. Meanwhile, when the quantization scale is small, the compression efficiency decreases although the amount of information lost through quantization decreases.

In contrast, a quantization parameter is a parameter used when quantization is carried out. The relation between the quantization scale and the quantization parameter is defined for each encoding scheme. When the quantization scale is represented by QS and the quantization parameter is represented by QP, the relation between QS and QP is $QS=2^{(QP-4.0)/6}$ for H. 264/ACV, and $QS=2 \times QP$ for MPEG-4. In the following description, "quantization control variable" is used as a term which encompasses both of the quantization scale and the quantization parameter.

The present invention has been accomplished in view of the above-described problems, and an object of the present invention is to provide a moving image encoding apparatus, a moving image encoding method, and a program which accurately estimate an amount of generated codes for each quantization control variable, and properly allocate a code amount for each frame.

Further, another object of the present invention is to provide a moving image encoding apparatus, a moving image encoding method, and a program which do not increase processing time significantly, while realizing accurate estimation of code amounts.

In order to achieve the above-described objects, the present invention provides a moving image encoding apparatus which carries out two-step encoding such that the nature of an image to be encoded is analyzed on the basis of results of first-step encoding, and second-step encoding is carried out on the basis of results of the analysis, the apparatus comprising first-step encoding means for executing a plurality of times the first-step encoding by use of different quantization control variables; code-amount estimation means for estimating, for all the quantization control variables, an amount of codes generated for each frame by making use of a plurality of results of the encoding by the first-step encoding means; code-amount allocation means for allocating an amount of codes for each frame on the basis of results of the estimation by the code-amount estimation means; and second-step encoding means for executing the second-step encoding on the basis of the amount of codes allocated to each frame by the code-amount allocation means.

Preferably, the first-step encoding means changes the number of times of execution of the encoding in accordance with the attribute of each frame. Further, preferably, the first-step encoding means omits a portion of processes contained in the coding process in the second and subsequent executions of the encoding process. Preferably, the code-amount estimation means selects a code-amount estimation logic for each frame. Further, preferably, the code-amount allocation means determines the quantization control variable such that the amount of codes for each frame, which is estimated by using the same quantization control variable becomes most suitable for a designated bit rate for an entire sequence of a moving image to be encoded, and allocates an amount of codes for each frame by using the determined quantization control variable.

The present invention also provides a moving image encoding method which carries out two-step encoding such that the nature of an image to be encoded is analyzed on the basis of results of first-step encoding, and second-step encoding is carried out on the basis of results of the analysis, the method comprising a first-step encoding step for executing a plurality of times the first-step encoding by use of different quantization control variables; a code-amount estimation step for estimating, for all the quantization control variables, an amount of codes generated for each frame by making use of a plurality of results of the encoding by the first-step encoding step; a code-amount allocation step for allocating an amount of codes for each frame on the basis of results of the estimation by the code-amount estimation step; and a second-step encoding step for executing the second-step encoding on the basis of the amount of codes allocated to each frame by the code-amount allocation step.

Preferably, the first-step encoding step changes the number of times of execution of the encoding in accordance with the attribute of each frame. Further, preferably, the first-step encoding step omits a portion of processes contained in the coding process in the second and subsequent executions of the encoding process. Preferably, the code-amount estimation step selects a code-amount estimation logic for each frame. Further, preferably, the code-amount allocation step determines the quantization control variable such that the amount of codes for each frame, which is estimated by using the same quantization control variable becomes most suitable for a designated bit rate for an entire sequence of a moving image to be encoded, and allocates an amount of codes for each frame by using the determined quantization control variable.

The present invention further provides a program which causes a computer to function as the moving image encoding apparatus of the present invention.

The present invention enables provision of a moving image encoding apparatus, a moving image encoding method, and a program which accurately estimate an amount of generated codes for each quantization control variable, and properly allocate a code amount for each frame. The present invention also enables provision of a moving image encoding apparatus, a moving image encoding method, and a program which do not increase processing time significantly, while realizing accurate estimation of code amounts.

DETAILED DESCRIPTION OF THE PREFERRED EMBODIMENT

An embodiment of the present invention will be described with reference to the accompanying drawings.

Figure 1:
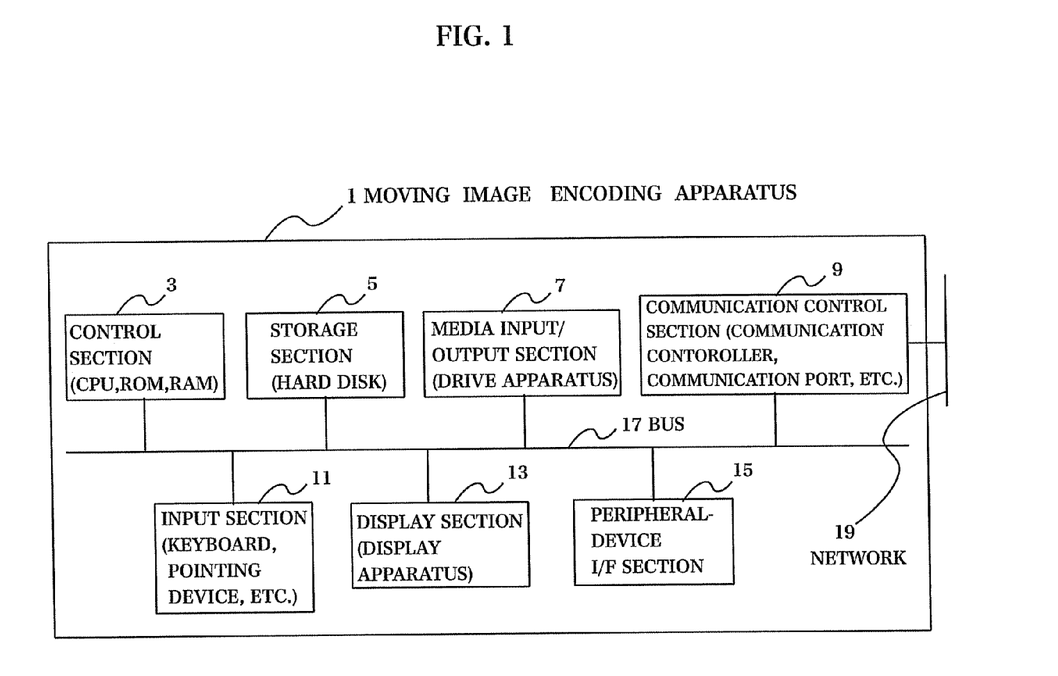
FIG. 1 is a block diagram showing the hardware configuration of a computer which realizes a moving image encoding apparatus.

FIG. 1 is a block diagram showing the hardware configuration of a computer for realizing a moving image encoding apparatus 1 according to the embodiment of the present invention. It should be understood that the hardware configuration shown in FIG. 1 is a mere example, and the computer may take any of other suitable hardware configurations in accordance with its intended use or purpose.

In the moving image encoding apparatus 1, a control section 3, a storage section 5, a media input/output section 7, a communication control section 9, an input section 11, a display section 13, a peripheral-device I/F section 15, and the like are interconnected by a bus 17.

The control section 3 includes a CPU (central processing unit), ROM (read only memory), RAM (random access memory), and the like.

The CPU reads out programs, which are stored in the storage section 5, the ROM, a recording media, etc., into a work memory area of the RAM, and executes the programs so as to drive and control the various devices interconnected through the bus 17, to thereby realize the process of the moving image encoding apparatus 1, which will be described later.

The ROM, which is a nonvolatile memory, permanently stores programs (including a boot program of the computer and BIOS), data, etc.

The RAM, which is a volatile memory, temporarily stores programs, which are loaded from the storage section 5, the ROM, the recording media, and the like, data, etc., and includes a work area, which is used by the control section 3 for execution of various processes.

The storage section 5, which is a hard disc (HDD), stores the programs executed by the control section 3, data necessary for program execution, an OS (operating system), etc. Those programs include a control program corresponding to the OS, and an application program corresponding to the process to be described later.

The codes of those programs are read out by the control section 3 when necessary and transferred to the RAM, and read out into the CPU and executed as various means.

The media input/output section (drive apparatus) 7 inputs and outputs data, and includes a media input/output device, such as a CD drive (for example, -ROM, -R, and -RW), a DVD drive, (for example, -ROM, -R, and -RW), or an MO drive.

The communication control section 9, which includes a communication controller, a communication port, etc., is a communication interface which mediates communications between the computer and a network 19, and controls communications with other computers through the network 19.

The input section 11 is provided for inputting data to the computer, and includes input devices such as a keyboard, a pointing device (e.g., a mouse), and ten keys.

An operator gives manipulation and operation instructions to the computer, and inputs data and the like to the computer, by means of the input section 11.

The display section 13 includes a display apparatus such as a CRT monitor or an LCD (liquid crystal display) panel, and a logic circuitry (video adaptor, etc.) for realizing a video function of the computer in cooperation with the display device.

The peripheral-device I/F section 15 is a port through which peripheral devices are connected to the compute. The computer transfers and receives data to and from the peripheral devices via the peripheral-device I/F section 15. The peripheral-device I/F section 15 takes the form of USB, IEEE 1394, RS-232C or the like, and usually includes a plurality of peripheral-device I/Fs. The peripheral-device I/F section may be connected to the peripheral devices in a wired or wireless manner.

The bus 17 is a path which mediates exchange of control signals, data signals, etc. among the relevant devices.

Figure 2:
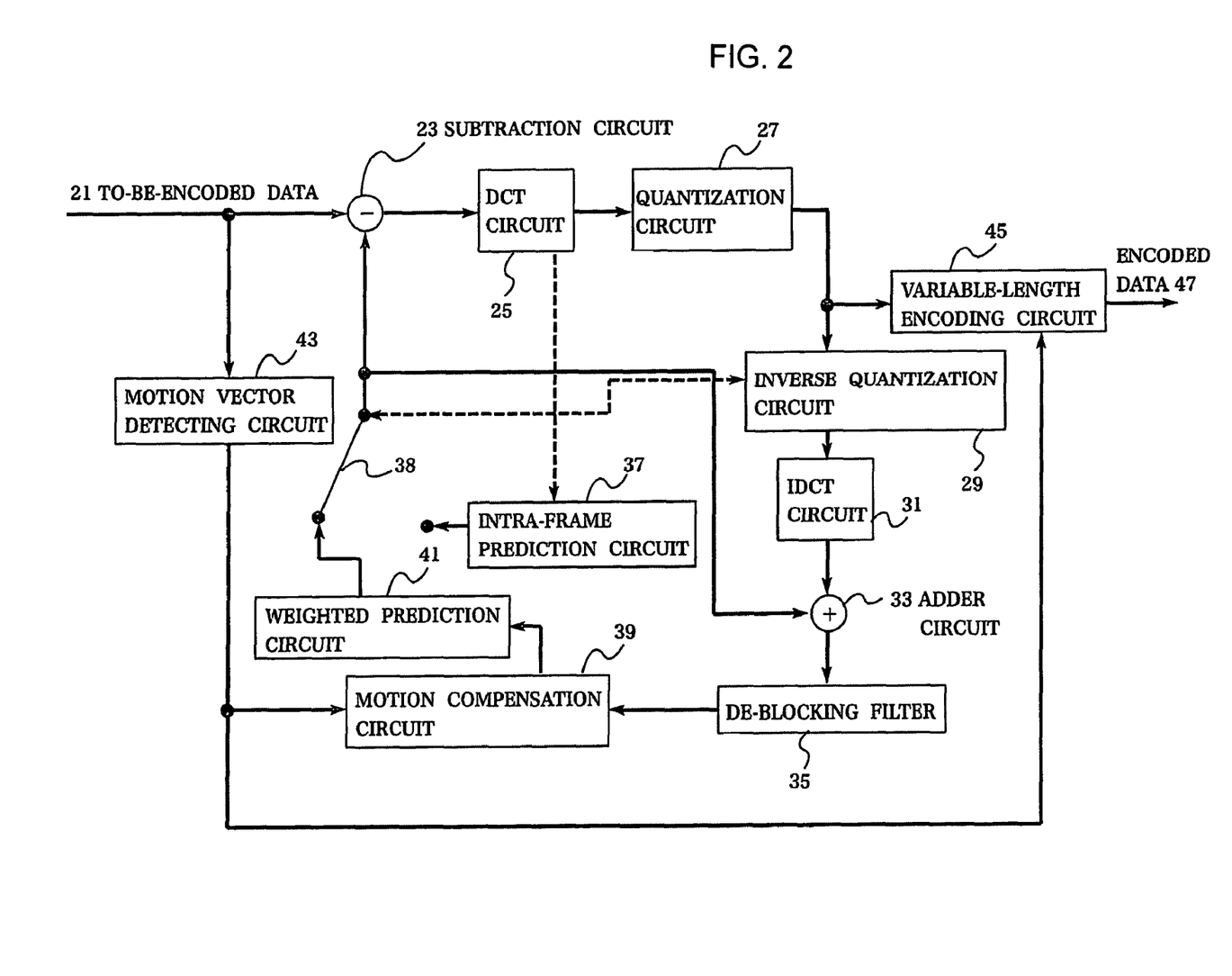
FIG. 2 is a block diagram showing the functions of encoding processing of the computer which conforms to the rules of H. 264/AVC.

An outline of the function of a coding process, which is contained in the computer which conforms to the rules of a standard scheme, will be described with reference to FIG. 2. FIG. 2 is a block diagram showing the functions for encoding, which are provided by the computer conforming to the rules of H. 264/AVC. When the moving image encoding apparatus 1 according to the present embodiment conforms to the rules of H. 264/AVC, the moving image encoding apparatus 1 has the functions shown in FIG. 2. In the present embodiment, H. 264/AVC is employed as the standard scheme; however, this is a mere example, and the technical concept of the moving image encoding apparatus 1 according to the present embodiment can be applied to other standard schemes (including those which will be determined in the future).

As shown in FIG. 2, the computer conforming to the rules of H. 264/AVC includes a subtraction circuit 23, a discrete cosine transform (DCT) circuit 25, a quantization circuit 27, an inverse quantization circuit 29, an inverse discrete cosine transform (IDCT) circuit 31, an adder circuit 33, a de-blocking filter 35, an intra-frame prediction circuit 37, a motion compensation circuit 39, a weighted prediction circuit 41, a motion vector detecting circuit 43, and a variable-length encoding circuit 45. It is noted that those circuits shown in FIG. 2 do not represent hardware circuits but represent the functions realized by software.

Data 21 to be encoded (to be referred to as to-be-encoded data) is defined as an aggregate of a plurality of frame data. The frame data consists of an aggregate of one or more number of macro blocks. The macro block includes a signal of intensity of a 16×16 pixel block and two signals of color difference of a 8×8 pixel block.

Each frame can be classified into one of the following frame types in accordance with restriction on prediction modes.

(1) I-frame, which is encoded within the frame, independently of frames preceding and subsequent to the frame (intra encoding).

(2) P-frame, which can be encoded through forward prediction between frames (inter encoding).

(3) B-frame, for which forward prediction, backward prediction, or bidirectional prediction can be used.

Macro blocks are classified into an intra macro block, which is independently encoded within the macro block, and an inter macro block, which is encoded through forward prediction between blocks.

The I-frame consists of only intra macro blocks. The P- and B-frames each consist of the intra macro block and the inter macro block.

A subtraction circuit 23 computes a difference between the frame data contained in the to-be-encoded data 21 and prediction data output from the intra-frame prediction circuit 37 or the weighted prediction circuit 41, and outputs the difference data to the DCT circuit 25.

The DCT circuit 25 performs a discrete cosine transform for the differential data output from the subtraction circuit 23 and outputs the resultant data to the quantization circuit 27 and, if necessary, to the intra-frame prediction circuit 37.

The quantization circuit 27 quantizes the transformed data output from the DCT circuit 25 by using a predetermined quantization parameter, and outputs the quantized data to the inverse quantization circuit 29 and the variable-length encoding circuit 45.

The inverse quantization circuit 29 carries out inverse quantization, which corresponds to the quantization performed by the quantization circuit 27, on the quantized data output from the quantization circuit 27, and outputs the inversely quantized data to the IDCT circuit 31.

The IDCT 31 carries out inverse discrete cosine transform, which corresponds to the discrete cosine transform carried out by the DCT circuit 25, on the inversely quantized data output from the inverse quantization circuit 29, and outputs the resultant data to the adder circuit 33.

The adder circuit 33 locally decodes the inversely transformed data output from the IDCT circuit 31 by using prediction data output from the intra-frame prediction circuit 37 or the weighted prediction circuit 41, and outputs the locally decoded data to the de-blocking filter 35.

The de-blocking filter 35 removes only distortions of blocks from the locally decoded data output from the adder circuit 33, and outputs the filtered data to the motion compensation circuit 39.

The intra-frame prediction circuit 37 carries out a prediction process on the basis of the transformed data output from the DCT circuit 25, by using neighboring pixels in the same frame, and outputs the resultant prediction data to the subtraction circuit 23 and the adder circuit 33. Reference numeral 38 denotes a switching means for effecting changeover between the intra-frame prediction circuit 37 and the weighted prediction circuit 41 when requested by the process.

The motion compensation circuit 39 performs a motion compensation process on the basis of motion vector data output from the motion vector detecting circuit 43 and the filtered data output from the de-blocking filter 35, and outputs the motion compensated data to the weighted prediction circuit 41.

The weighted prediction circuit 41 performs weighted prediction on the motion compensated data output from the motion compensation circuit 39, and outputs the prediction data to the subtraction circuit 23 and the adder circuit 33.

The motion vector detecting circuit 43 detects a motion vector on the basis of the frame data contained in the to-be-encoded data 21 and the past frame data, and outputs the motion vector to the motion compensation circuit 39 and the variable-length encoding circuit 45.

The variable-length encoding circuit 45 stores into a buffer (not shown) encoded data 47, which includes the quantized data output from the quantization circuit 27, the motion vector data output from the motion vector detecting circuit 43, etc.

A configuration to realize the overall function of the moving image encoding apparatus 1 according to the present embodiment will be described with reference to FIGS. 3 to 7.

Figure 3:
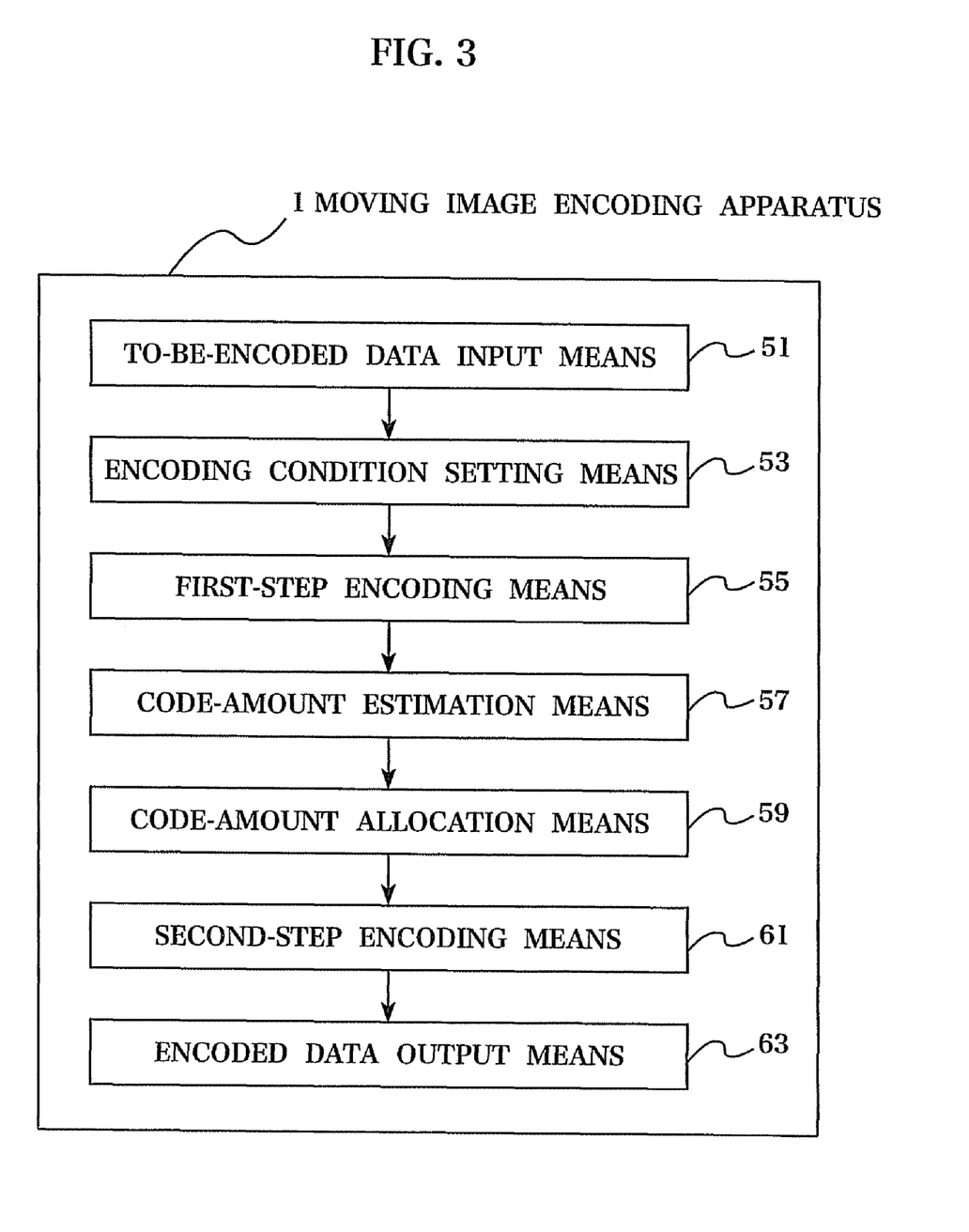
FIG. 3 is a block diagram showing the functions of the moving image encoding apparatus.

FIG. 3 is a block diagram showing the functions of the moving image encoding apparatus 1.

As shown in FIG. 3, the moving image encoding apparatus 1 includes a to-be-encoded data input means 51, an encoding condition setting means 53, a first-step encoding means 55, a code-amount estimation means 57, a code-amount allocation means 59, a second-step encoding means 61, an encoded data output means 63, and the like. The moving image encoding apparatus 1 carry out two-step encoding such that the nature of an image to be encoded is analyzed on the basis of results of first-step encoding, and second-step encoding is carried out on the basis of results of the analysis.

The to-be-encoded data input means 51 inputs the to-be-encoded data 21 to the moving image encoding apparatus. The data may be input from each media by using the media input/output section 7. The data may be input from another computer through the network 19 by using the communication control section 9. Further, the data may be input from each peripheral device by using the peripheral-device I/F section 15.

If necessary, the to-be-encoded data 21, which has been input, may be temporarily stored in the storage section 5, and the control section 3 reads the data from the storage section 5 and executes the process to be described later. In an alternative, the to-be-encoded data may be stored in the RAM of the control section 3 and the control section executes the process to be described later.

The encoding condition setting means 53 sets an encoding condition associated with an encoding process to be described later. The encoding condition may be input to the moving image encoding apparatus, through the input section 11 or from another computer through the network 19 by using the communication control section 9. The encoding condition setting means 53 holds the input encoding condition by setting a predetermined variable to assume a corresponding value, which is used in the process to be described later. Here, the encoding condition is, for example, a bit rate. The encoding condition may be a default value of another control variable.

The first-step encoding means 55 executes the first-step encoding a plurality of times by using different quantization control variables. The encoding process is carried out by using the function described in connection with FIG. 2. The quantization control variable may be a quantization scale or a quantization parameter. To avoid confusion in meaning, a case where the quantization parameter is used as the quantization control variable will be describe hereinafter. It should be understood that the technical concept of the present invention is similarly applicable to a case where the quantization scale is used as the quantization control variable.

The first-step encoding, which is executed by the first-step encoding means 55, is performed for gathering information on the nature of an image of each frame from the moving image data to be encoded. The information gathered here contains the frame type determined for each frame, the quantization parameter used in executing the encoding process, the amount of codes generated for each frame, the number of intra macro blocks contained in the frame and the number of bits generated as the intra macro blocks, the number of inter macro blocks contained in the frame and the number of bits generated as the inter macro blocks, and the like. The information to be gathered can be appropriately selected in accordance with an estimation logic of the code-amount estimation means 57, which will be described later.

The first-step encoding means 55 changes the number of times of its encoding operation depending on the attribute of each frame.

Figure 4:
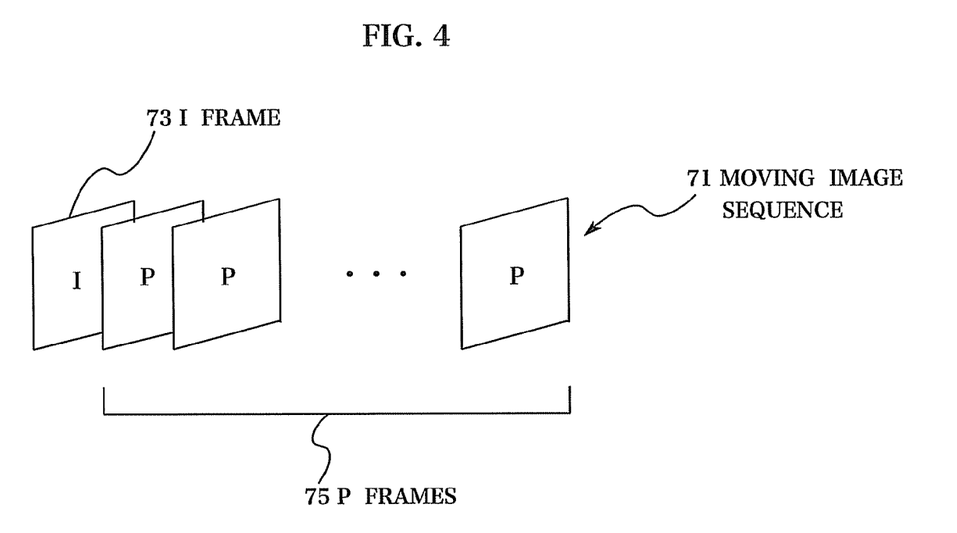
FIG. 4 is a diagram showing a first example of classification by frame attribute.

FIG. 4 is a diagram showing a first example of classification by frame attribute.

As shown in FIG. 4, the frames contained in a moving image sequence 71 can be classified according to the frame type. Specifically, the frames may be classified into an I-frame 73, a P-frame 75, etc. For both the I-frame 73 and the P-frame 75, a first execution logic of the first-step encoding means 55 executes the first-step encoding the equal number of times while using several kinds of quantization parameters.

Although the B-frame is not mentioned here, the B-frame can be handled in the same manner as the P-frame in terms of determination of the first execution logic and an estimation logic of the code-amount estimation means 57 to be described later.

The encoding process according to the present embodiment may be applied to the entire moving image sequence 71. Alternatively, the moving image sequence 71 is divided into units (for example, groups of pictures), and the encoding process is applied to those units.

Figure 5:
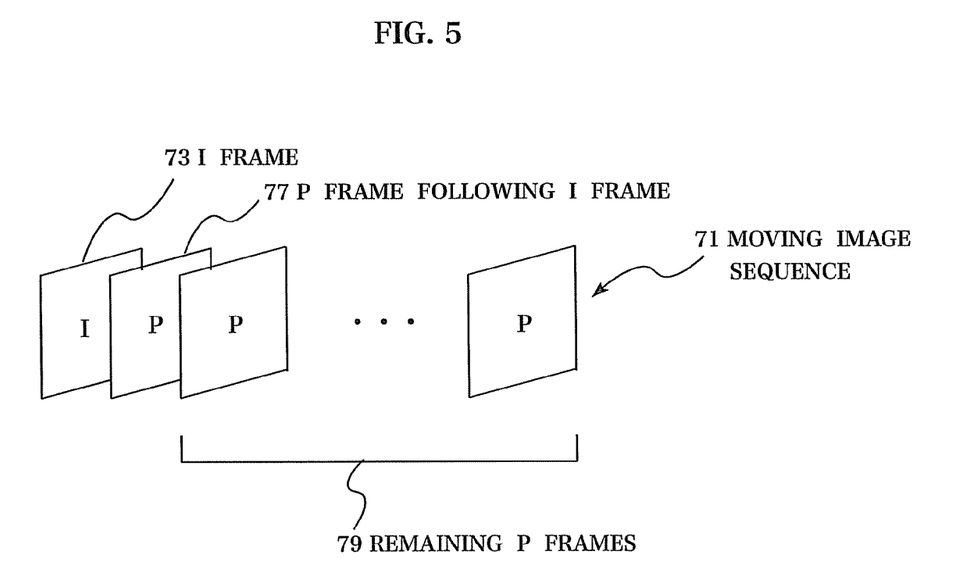
FIG. 5 is a diagram showing a second example of classification by frame attribute.

FIG. 5 is a diagram showing a second example of classification by frame attribute.

As shown in FIG. 5, the frames contained in the moving image sequence 71 can be classified according to the frame attribute based on the frame type. Specifically, those frames may be classified into an I-frame 73, a P-frame 77 following the I-frame, and the remaining P-frames 79. A second execution logic of the first-step encoding means 55 changes the number of times of encoding for each of those frames classified into three types. For example, for the I-frame 73, the second execution logic executes the first-step encoding a plurality of times by using several kinds of quantization parameters. For the P-frame 77 following the I-frame, the second logic executes the first-step encoding a plurality of times by using the quantization parameters, which are the same as those used for the encoding of the preceding I-frame 73. For the remaining P-frames 79, the second logic executes the first-step encoding one time by using one kind of the quantization parameter.

Although the B-frame is not mentioned here, the B-frame can be handled in the same manner as the P-frame in terms of determination of the second execution logic and the estimation logic of the code-amount estimation means 57 to be described later.

The encoding process according to the present embodiment may be applied to the entire moving image sequence 71. Alternatively, the moving image sequence 71 is divided into units (for example, groups of pictures), and the encoding process is applied to each unit.

The reason why the second execution logic executes the first-step encoding only one time for the remaining P-frames 79 is the necessity of reducing a load imposed on the CPU by the computing process (hereinafter referred to as the computing process load). When the encoding process is executed one time, a problem arises in the accuracy in estimating the amount of codes. To cope with the problem, in estimating the amount of codes of the remaining P-frames 79, reference is made to the result of encoding of the P-frame 77 following the I-frame. The reason why the code-amount estimation accuracy is maintained at a satisfactory level is that the nature of the images of the remaining P-frames 79 resembles that of the image of the P-frame 77 following the I-frame.

As already described, in the encoding process carried out by the first-step encoding means 55, the same frame is encoded a plurality of times by using different quantization parameters. Accordingly, the computing process load increases in proportion to the number of encoding operations. To avoid the increase of the computing process load, the first-step encoding means 55 omits some processes that are contained in the encoding process already described referring to FIG. 2, in the second and subsequent executions of the first-step encoding. Specifically, the first-step encoding means 55 omits the motion vector detecting process, the de-blocking filter process, the motion compensation prediction process, the inverse quantization process, and the IDCT process. Those omitted processes do not affect the amount of generated codes in the second and subsequent executions of the first-step encoding, or alternative means for those processes are present. In the case of the motion vector, for example, the motion vector obtained in the first-time encoding process may be commonly used for the second and subsequent executions of the first-step encoding. Therefore, there is no need of carrying out the motion vector detecting process in the second and subsequent executions of the first-step encoding.

Returning to FIG. 3, the code-amount estimation means 57 estimates an amount of codes generated from each frame for all the quantization parameters by using the results of encoding operations performed by the first-step encoding means 55. Specifically, the code-amount estimation means 57 properly selects an estimation logic for estimating an amount of codes generated for each frame by using information on the results of the encoding operations performed by using a plurality of quantization parameters, which are gathered by the first-step encoding means 55, and estimates the amounts of codes for all of the quantization parameters.

Figure 6:
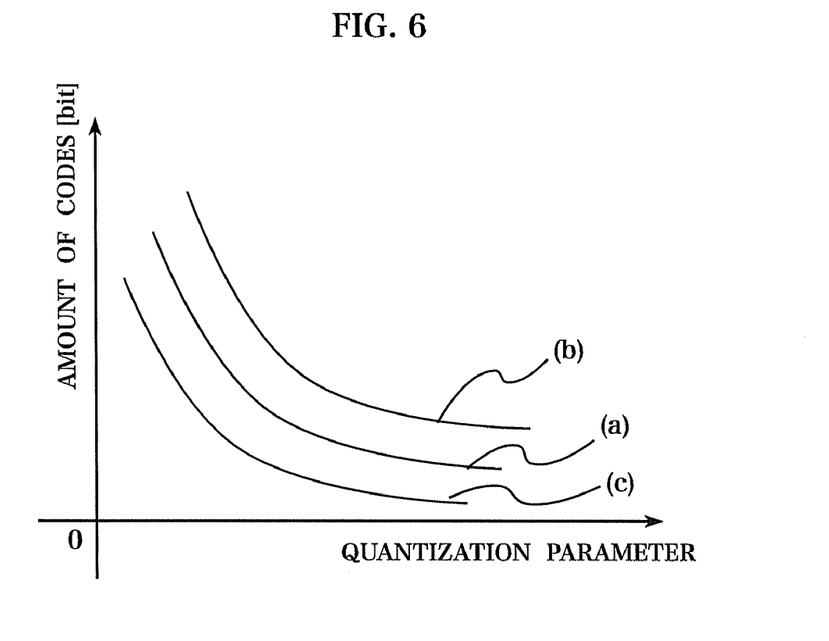
FIG. 6 is a graph showing the relationship between quantization parameters and amounts of generated codes.

FIG. 6 is a graph showing the relationship between quantization parameters and amounts of generated codes.

In general, the relationship between the quantization parameter and the amount of generated codes varies depending on the nature of an image. In FIG. 6, a curve (a) shows the relationship between the quantization parameter and the amount of generated codes for a standard image. When a change in the image is large, the quantization parameter and the amount of generated codes have a relationship as indicated by a curve (b). When a change in the image is small, the quantization parameter and the amount of generated codes a relationship as indicated by a curve (c). In a case where, as in the conventional art, the first-step encoding is executed only one time and an amount of codes generated for one quantization parameter (hereinafter, simply referred to as "sample value") has been gathered, it is difficult to determine a mathematical expression describing the relationship between the quantization parameter and the amount of generated codes, which changes depending on the nature of the image. Even if the mathematical expression can be determined by using one sample value, it is clear that an amount of generated codes, which is estimated by the expression, has a large error.

The code-amount estimation means 57 estimates the relationship between the quantization parameter and the amount of generated codes by using a plurality of sample values gathered by the first-step encoding means 55.

A first estimation logic will first be described. The first estimation logic uses the following expression.

$$Bit = \Delta Bit \times \frac{2^{(QP_2 - qp)/6}}{2^{(QP_2 - QP_1)/6}} + \beta \qquad \text{[Expression 1]}$$

where $QP_1$, $QP_2$: quantization parameters used in executing the first-step encoding qp: a quantization parameter in a range of $(QP_1+1)$ to $(QP_2-1)$ inclusive Bit: the estimated amount of codes generated (when the quantization parameter=qp)

$\Delta$Bit: (the amount of codes generated when the quantization parameter=$QP_1$)−(the amount of codes generated when the quantization parameter=$QP_2$)

$\beta$: the amount of codes generated when the quantization parameter=$QP_2$

According to the rules of H. 264/AVC, when the quantization parameter is increased by 6, the quantization step size becomes doubled, and the amount of generated codes becomes approximately ½. Expression 1 used by the first estimation logic is based on this fact.

A second estimation logic will be described. The second estimation logic uses the following expressions.

$$Bit = a \times QP^2 + b \times QP + c$$

$$Bit = a \times QP^3 + b \times QP^2 + c \times QP + d$$

$$Bit = a \times QP^4 + b \times QP^3 + c \times QP^2 + d \times QP + e \qquad \text{[Expression 2]}$$

where $QP_1$, $QP_2$: the minimum and maximum values of the quantization parameter used in executing the first-step encoding qp: a quantization parameter in a range of $(QP_1+1)$ to $(QP_2-1)$ inclusive Bit: the estimated amount of codes generated (when the quantization parameter=qp)

In the second estimation logic using Expression 2, the amount of generated codes is estimated by using a polynomial expression. When the amount of generated codes is estimated by using a polynomial as described above, as the degree of the polynomial increases, the number of necessary sample values, i.e. the number of times of execution of the first-step encoding, increases. Three sample values are needed for the quadratic polynomial; four sample values are needed for the cubic polynomial; and five sample values are needed for the quartic polynomial.

A third estimation logic will be described.

The third estimation logic uses the following expression.

$$Bit = \alpha \times QS^{-\beta} + \delta \quad \text{[Expression 3]}$$

where
QS: quantization scale
$\alpha$, $\beta$: coefficients
$\delta$: the amount of codes (header, etc.) irrelevant to the encoding process
Bit: the estimated amount of codes generated (when the quantization parameter=QS)

The quantization scale is computed by using a quantization parameter. In the third estimation logic, since two values ($\alpha$ and $\beta$), which are the coefficients affected by the quantization are determined, at least two sample values are needed.

A fourth estimation logic will be described.

The fourth estimation logic is used for estimation of the amount of generated codes of each of the remaining P-frames 79. Therefore, the fourth estimation logic utilizes not only the sample value of each P frame itself, but also the estimation result of other frames. The reason for this is that since only one sample value is gathered for each of the remaining P-frames 79, it is difficult to estimate the amount of generated codes by using only the sample value of the P frame itself as in the case of the first to third estimation logics.

Specifically, the fourth estimation logic uses the following expression.

$$Bit(X, qp) = \frac{Bit(X, QP_1)}{Bit(Y, QP_1)} Bit(Y, qp) \quad \text{[Expression 4]}$$

where
X: the remaining P-frames 79 to be estimated
Y: the P-frame 77 following the I-frame, the result of estimation for the P-frame 77 being used
$QP_1$: a quantization parameter used for executing the first-step encoding for X
Bit (F, QP): the estimated amount of generated codes of the frame F when the quantization parameter is QP In the expression 4, Bit (X, $QP_1$) and Bit (Y, $QP_1$) are sample values, and Bit (Y, qp) is the result of estimation for Y. The amount of generated codes of the remaining P-frames 79 is estimated at the same rate as the amount of generated codes of the P-frame 77 following the I-frame. As a result, the amount of generated codes can be estimated by using only one sample value, while maintaining the satisfactory estimation accuracy.

Figure 7:
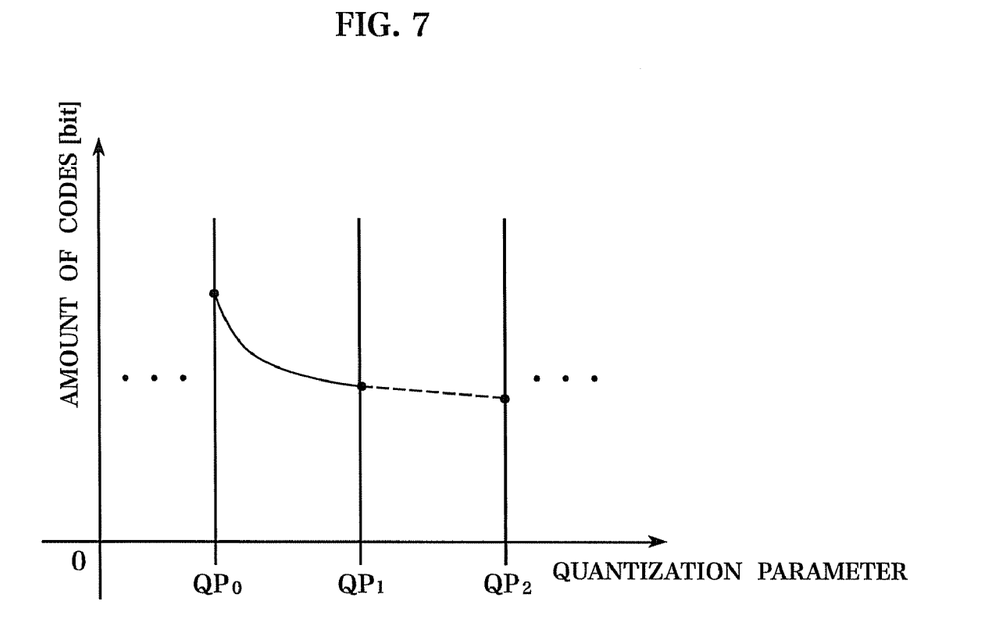
FIG. 7 is a graph showing section-by-section code-amount estimation.

FIG. 7 is a graph showing section-by-section code-amount estimation.

As shown in FIG. 7, the value range of the quantization parameter qp is segmented into a plurality of sections; i.e., a section (1) where $QP_0+1 \leq qp \leq QP_1-1$ and a section (2) where $QP_1+1 \leq qp \leq QP_2-1$, and the code amount estimation is performed separately for each section. Further, the code amount estimation may be performed by use of different estimation logics for the sections.

For example, when the value range of the quantization parameter is divided as shown in FIG. 7, and the first estimation logic is separately applied to the sections (1) and (2) for code amount estimation, the first-step encoding is first executed three times by using three quantization parameters $QP_0$, $QP_1$ and $QP_2$. Then, for the section (1), the amount of codes is estimated by using the sample values obtained by use of the quantization parameters $QP_0$ and $QP_1$. For the section (2), the amount of codes is estimated by using the sample values obtained by use of the quantization parameters $QP_1$ and $QP_2$.

When the quantization parameter qp is in a section (3) where $qp \leq QP_0-1$ or in a section (4) where $QP_2+1 \leq qp$, estimation is performed by executing the first-step encoding by making use of different quantization parameters. When it is clear from a designated bit rate that the quantization parameters contained in the sections (3) and (4) are not used in the second-step encoding, there is no need of estimating the amount of codes in these sections. That is, a code amount estimation range may be limited by defining the maximum value and the minimum value of the quantization parameter according to the designated bit rate.

A description will be given about a relationship between the execution logic for executing the first-step encoding in the first-step encoding means 55 and an estimation logic for estimating the amount of codes in the code-amount estimation means 57.

Figure 8:
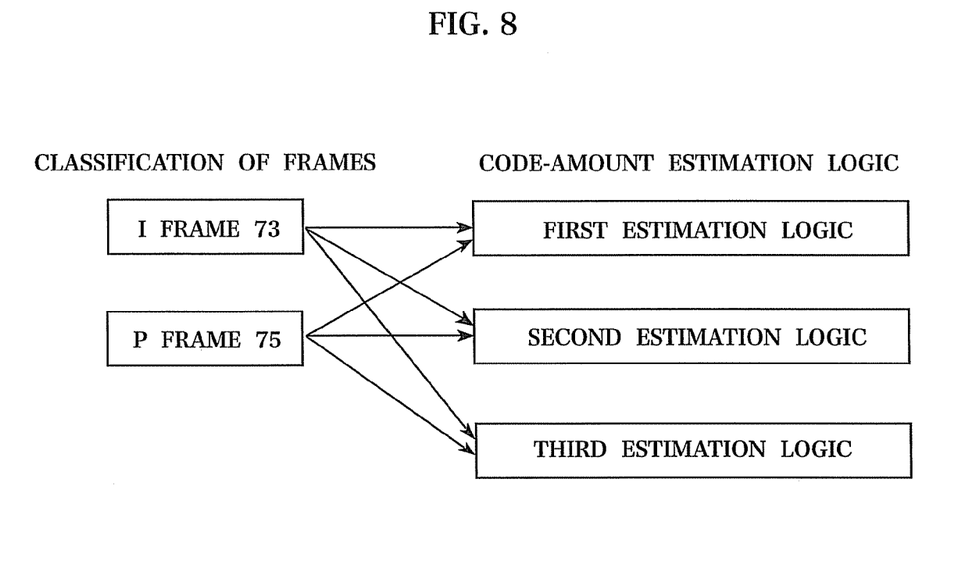
FIG. 8 is a block diagram showing selection of an estimation logic for the case where first-step encoding is performed by a first execution logic.

FIG. 8 is a diagram showing the selection of the estimation logic when the first-step encoding is executed by the first execution logic.

As shown in FIG. 8, in the first execution logic, the frames are classified into the I-frame 73 and the P-frame 75. For the code amount estimation for the I-frame 73, any of the first to third estimation logics may be selected. Also, for the code amount estimation for the P-frame 75, any of the first to third estimation logics may be selected.

Figure 9:
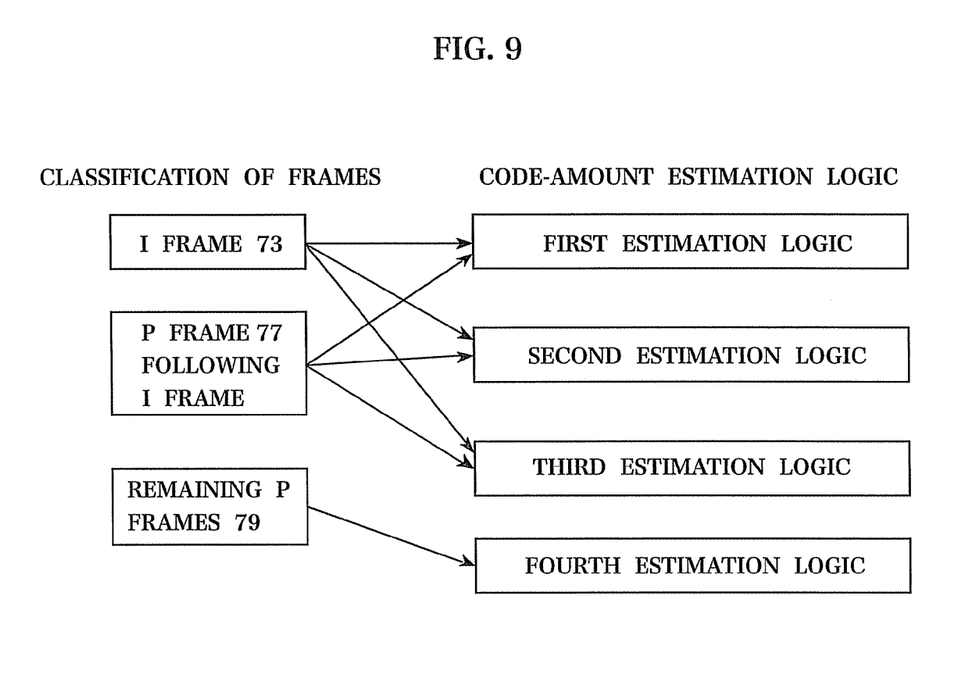
FIG. 9 is a block diagram showing selection of an estimation logic for the case where first-step encoding is performed by a second execution logic.

FIG. 9 is a diagram showing the selection of the estimation logic when the first-step encoding is executed by the second execution logic.

As shown in FIG. 9, in the second execution logic, the frames are classified into the I-frame 73, the P-frame 77 following the I-frame, and the remaining P-frames 79. For the code amount estimation for the I-frame 73 and the P-frame 77 following the I-frame, any of the first to third estimation logics may be selected. For the code amount estimation for the remaining P-frames 79, only the fourth estimation logic may be selected.

It will be understood that the first to fourth estimation logics, which have been described, are presented by way of examples, and another estimation logic may be used for estimating the amount of codes, as a matter of course. For example, when the first-step encoding means 55 gathers the number of intra macro blocks contained in the frame and the number of bits generated as the intra macro blocks, and the number of inter macro blocks contained in the frame and the number of bits generated as the inter macro blocks, the amount of codes can be estimated for each macro block. In this case, the estimation accuracy becomes higher.

Thus, the code-amount estimation means 57 can select the code-amount estimation logic for each frame. The code-amount estimation means 57 can perform accurate code amount estimation by selecting the best estimation logic from various types of estimation logics.

Returning to FIG. 3, the code-amount allocation means 59 allocates the amount of codes for each frame on the basis of the result of the estimation by the code-amount estimation means 57.

In general, in an encoding process involving quantization, an encoding distortion increases with an increase in the number of the quantization parameters, resulting in deterioration of the quality of the image after it is decoded. The encoding distortion is determined by only the quantization parameter and does not depend on the nature of the image. In other words, it is known that to obtain a stable quality of the reproduced image for the entire moving image sequence 71, what a designer has to do is to use uniform quantization parameters by minimizing a variation of the quantization parameters. Accordingly, what the designer has to do is to determine such a quantization parameter that the amount of codes for each frame, which is estimated by using the same quantization parameter is most suitable for a designated bit rate for the entire moving image sequence 71 to be encoded, and to determine the amount of codes allocated for each frame by using the determined quantization parameter.

Specifically, the code-amount allocation means 59 first sets a target value of the sum of the amounts of codes on the basis of the designated bit rate. Then, the code-amount allocation means 59 computes the sum of the amounts of codes estimated for each frame. The code-amount allocation means 59 determines a quantization parameter which minimizes the difference between the target value of the sum of the amounts of codes that is set on the basis of the designated bit rate and the sum of the amounts of codes estimated for each frame. The code-amount allocation means 59 allocates, for each frame, the amount of codes that is estimated by using the determined quantization parameter.

The code-amount allocation means 59 checks whether or not the code amount allocation satisfies the related rule and adjusts the assigned code-amount for correction, if necessary.

Specifically, the code-amount allocation means 59 checks whether or not an underflow or overflow occurs in the buffer, that is, the condition regarding the buffer occupation quantity is satisfied by using a receiving buffer model of a virtual decoder employed as a VBV (video buffer verifier). If the condition is not satisfied, the code-amount allocation means 59 adjusts the assigned code-amount for correction. This technical scheme may be realized by using the technology disclosed in Japanese Patent Application No. 2006-021965.

The second-step encoding means 61 executes second-step encoding by using the amount of codes allocated for each frame by the code-amount allocation means 59. The second-step encoding is executed only one time. When the rules of H.264/AVC are employed, the encoding process already described referring to FIG. 2 is executed.

The encoded data output means 63 outputs encoded data 47, which has been stored into the buffer by the second-step encoding means 61. The data may be output to each media by the media input/output section 7. It may also be output to another computer via the network 19 by the communication control section 9. Further, it may be stored into the storage section 5.

Operations of the moving image encoding apparatus 1 will be described in detail with reference to FIG. 10.

Figure 10:
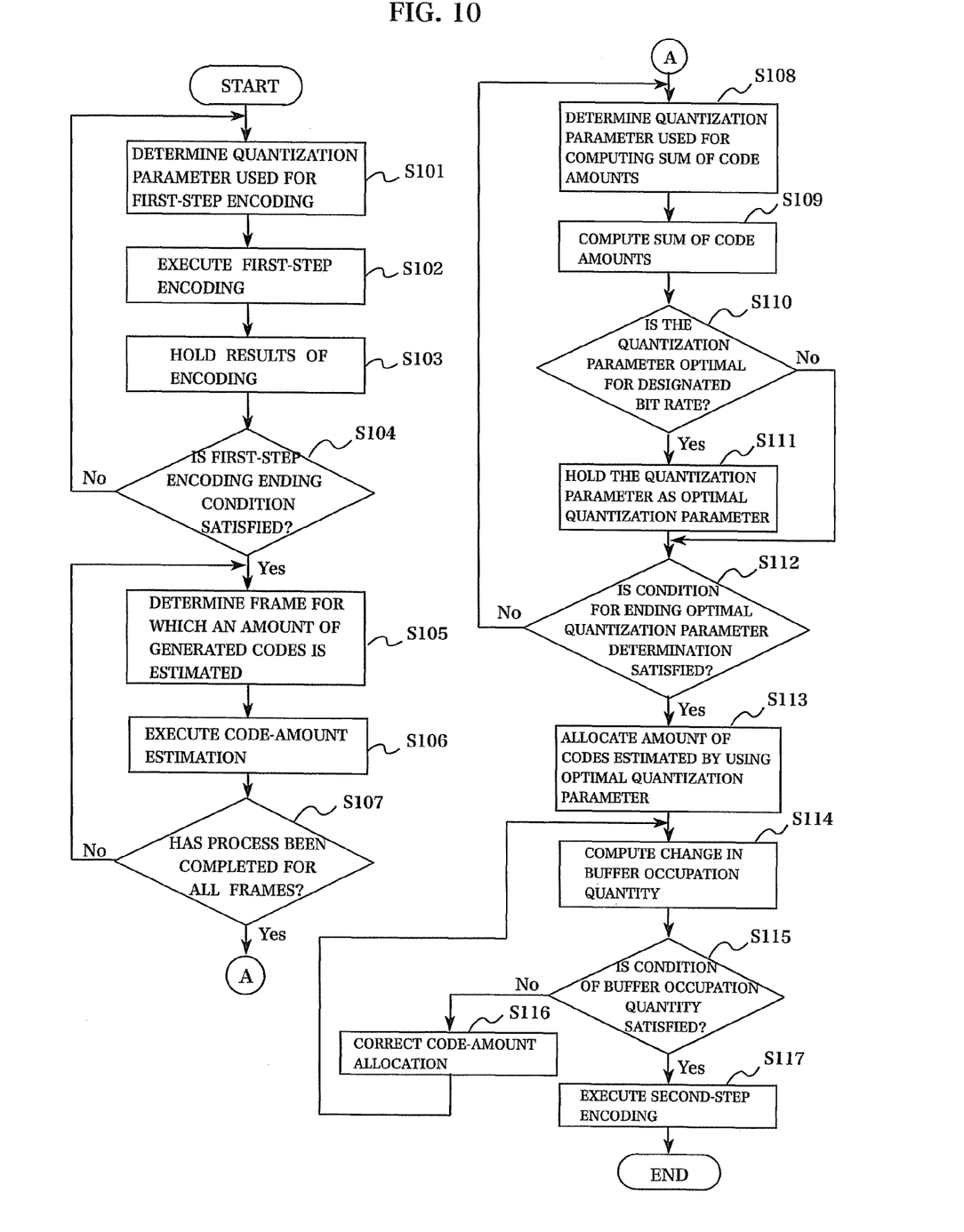
FIG. 10 is a flowchart showing the entire flow of two-step encoding processing.

FIG. 10 is a flow chart showing the entire flow of two-step encoding.

A specific example of the encoding process will be described together with the flow chart. In the specific example, in accordance with the second execution logic of the first-step encoding means 55, the first-step encoding is performed three times for the I-frame 73 and the P-frame 77 following the I-frame, and the first-step encoding is performed one time for the remaining P-frames 79. The quantization parameter used for the first to third executions of the encoding process is set in advance.

As shown in FIG. 10, the control section 3 determines a quantization parameter used for the first-step encoding (S101), executes the first-step encoding by using the determined quantization parameter (S102), and holds the encoding result (S103).

In the specific example, when the process ranging from step S101 to step S103 is performed first time, the control section 3 determines that the first time quantization parameter, which is set in advance, is to be used for the encoding process, executes the first-step encoding for all of the frames, i.e. the I-frame 73, the P-frame 77 following the I-frame, and the remaining P-frames 79, and holds the encoding result.

When the process ranging from step S101 to step S103 is performed second time or third time, the control section 3 determines that a second or third time quantization parameter, which is set in advance, it to be used for the encoding process, executes the first-step encoding for the I-frame 73 and the P-frame 77 following the I-frame, and holds the encoding result. In this instance, when the encoding process is executed, the processes, which doe not affect the information to be gathered may be omitted.

Then, the control section 3 checks whether or not the condition to end the first-step encoding is satisfied (S104). Here, the ending condition is that the process ranging from step S101 to step S103 has been executed three times.

If the ending condition is not satisfied (NO in step S104), the control section repeats the process from step S101.

If the ending condition is satisfied (YES in step S104), the control section proceeds to step S105.

Then, the control section 3 determines a frame from which the amount of codes generated is to be estimated (S105), and executes the code amount estimation for the determined frame (S106).

In the specific example, the frames for which the code amounts are to be estimated are determined in the sequential order of the moving image sequence 71. The code amount estimation cannot be performed for the remaining P-frames 79 unless the estimation of the amount of codes of the P-frame 77 following the I-frame, which amount of codes is referred to, ends.

For the selection of the code amount estimation logic, any of the first to third estimation logics may be selected for the I-frame 73 and the P-frame 77 following the I-frame. Since the number of samples is 3, when the second estimation logic is used, the quadratic polynomial is used for the code amount estimation. For the remaining P-frames 79, only the fourth estimation logic can be selected.

Then, the control section 3 checks whether or not the code amount estimation process has completed for all of the frames (S107).

Although in the description of the specific example, the number of frames was not referred to, if the number of frames is 300, the process from step S105 to S107 is repeated 300 times.

If the code amount estimation process has not yet completed (NO in step S107), the control section repeats the process from step S105.

If the code amount estimation process has completed (YES in step S107), the control section proceeds to step S108.

Next, the control section 3 determines a quantization parameter used for computing the sum of the amounts of codes (S108), and computes the sum of the code amounts (S109).

In the description of the specific example, the range of the quantization parameter is not mentioned. If the minimum value and the maximum value of the quantization parameter are set to 5 and 45, respectively, in advance, the quantization parameter may be determined by changing its value from 5, which is the minimum value, by adding 1 thereto each time.

Alternatively, the quantization parameter may be determined by changing its value from 45, which is the maximum value, by subtracting 1 therefrom each time.

If the number of frames is 300, the sum of the amounts of codes is computed by substituting the determined value of the quantization parameter into 300 estimation formulae so as to compute the amount of codes for each frame, and summing those amounts of codes.

Then, the control section 3 checks whether or not the quantization parameter is optimal for the designated bit rate (S110).

Specifically, the control section 3 computes the difference between the target value of the sum of code amounts set on the basis of the designated bit rate and the sum of code amounts computed in step S109. When the computed difference is smaller than the difference between the target value of the sum of code amount and the sum of code amounts computed by use of the current optimal quantization parameter, the control section determines that that quantization parameter is optimal (at present).

If the quantization parameter is optimal (YES in step S110), the control section holds the quantization parameter as the optimal quantization parameter (S111).

If the quantization parameter is not optimal (NO in step S110), the control section proceeds to step S112.

Then, the control section 3 checks whether or not the condition to end the process for determining the optimal quantization parameter is satisfied (S112).

The condition to end the process for determining the optimal quantization parameter is that the process ranging from step S108 to step S111 has been executed for all of available quantization parameters.

If the ending condition is not satisfied (NO in step S112), the control section repeats the process from step S108.

If the ending condition is satisfied (YES in step S112), the control section proceeds to step S113.

The control section 3 then allocates the amount of codes estimated by using the optimal quantization parameter (S113).

Next, the control section 3 computes a change in the buffer occupation quantity (S114), and checks if the condition of the buffer occupation quantity is satisfied (S115).

If the condition is not satisfied (NO in S115), the control section 3 adjusts the allocation of the amount of codes for correction (S116), and repeats the process from step S114.

If the condition is satisfied (YES in S115), the control section proceeds to step S117.

The control section 3 executes a second-step encoding according to the amount of codes allocated for each frame (S117).

As described, the moving image encoding apparatus 1 executes two-step encoding such that the nature of an image to be encoded is analyzed on the basis of results of first-step encoding, and second-step encoding is carried out on the basis of results of the analysis.

TEST EXAMPLE

Test example associated with the embodiment of the present invention will be described with reference to FIG. 11.

Figure 11:
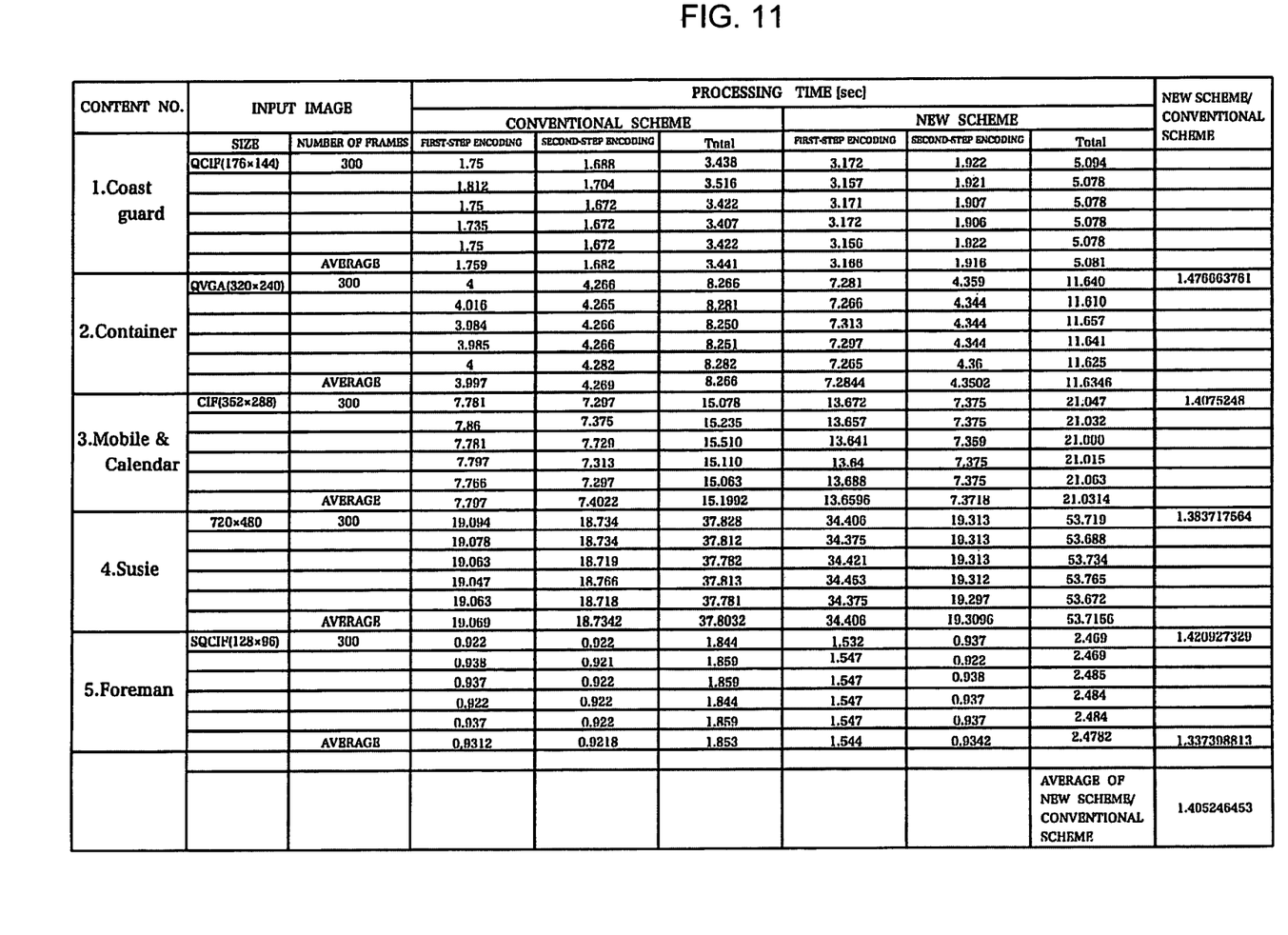
FIG. 11 is a table showing results of a performance test performed for a conventional scheme and a new scheme according to an embodiment.

FIG. 11 is a table showing results of a performance test performed for a conventional scheme and a new scheme according to an embodiment.

A personal computer (PC) used in the test example has specifications as follows:
CPU: Pentium (registered trademark) D (Operating frequency: 3.2 GHz)
Memory: 1 GB
Available capacity of HDD : 66.7 GB
OS: Windows (registered trademark) XP The encoding process was performed in accordance with the standard scheme of H. 264/AVC. The frame rate was 30 fps, and the bit rate was 256 kbps. The sample moving image data for test, which is frequently used for the performance test, was used as the contents to be encoded.

In the case of the conventional scheme shown in FIG. 11, the first-step encoding was executed one time. In the case of the new scheme according to the embodiment, the first-step encoding was executed three times by using three kinds of quantization parameters. The frames were classified into the I-frame 73 and the P-frame 75 as shown in FIG. 4. The first-step encoding was executed for both the types of frames the equal number of times, i.e. three times. The code-amount estimation means 57 used the third estimation logic.

For all the contents, the time required for the first-step encoding of the new scheme is two times or less the time required for the first-step encoding of the conventional scheme. In the new scheme, the first-step encoding is executed three times. Therefore, under simple computation, the required time would be 3 times that required in the conventional scheme. However, since the new scheme employs the above-mentioned mechanism for suppressing an increase in the processing time, the new scheme successfully avoided remarkable increase of the processing time while realizing accurate estimation of the amount of codes.

The ratio of (the overall processing time of the new scheme)/(the overall processing time of the conventional scheme) was about 1.4 in average. This figure shows that no problem arises in practical use.

As described above, the moving image encoding apparatus 1 according to the embodiment of the present invention executes the first-step encoding a plurality of times by using different quantization parameters, and estimates, for all of the quantization parameters, the amount of codes generated for each frame by making use of a plurality of results of the encoding in the first step. Further, the moving image encoding apparatus 1 allocates the amount of codes for each frame on the basis of the results of the code amount estimation, and executes the second-step encoding on the basis of the amount of codes allocated for each frame. Particularly, the moving image encoding apparatus 1 changes the number of times of execution of the first-step encoding in accordance with the attribute of each frame, and omits some of the process contained in the second and subsequent encoding processes. For the code-amount estimation, the moving image encoding apparatus 1 selects the code-amount estimation logic for each frame.

The moving image encoding apparatus 1 according to the embodiment of the present invention can accurately estimate an amount of generated codes for each quantization control variable, and properly allocate a code amount for each frame. Further, the moving image encoding apparatus 1 can suppress an increase in the processing time, while realizing accurate estimation of code amounts.

In the above, the preferred embodiment of the moving image encoding apparatus, etc., of the present invention has been described with reference to the accompanying drawings. However, the present invention is not limited to the embodiment. It is clear for a person with ordinary skill in the art that numerous modifications and variations of the present invention are possible with the scope of the technical concept disclosed herein, and that such modifications and variations naturally fall within the scope of the present invention.

What is claimed is:

1. A moving image encoding apparatus which carries out two-step encoding such that the nature of an image to be encoded is analyzed on the basis of results of first-step encoding, and second-step encoding is carried out on the basis of results of the analysis, the apparatus comprising:

first-step encoding means for executing a plurality of times the first-step encoding by use of different quantization control variables for each frame;

code-amount estimation means for estimating, for all the quantization control variables, an amount of codes generated for each frame by making use of a plurality of results of the encoding by the first-step encoding means;

code-amount allocation means for allocating an amount of codes for each frame on the basis of results of the estimation by the code-amount estimation means; and second-step encoding means for executing the second-step encoding on the basis of the amount of codes allocated to each frame by the code-amount allocation means, wherein the first-step encoding means omits the motion vector detecting process, the de-blocking filter process, the motion compensation prediction process, the inverse quantization process, and the IDCT process contained in the second and subsequent executions of the encoding process for each frame.

2. A moving image encoding apparatus according to claim 1, wherein the first-step encoding means changes the number of times of execution of the encoding in accordance with the attribute of each frame.

3. A moving image encoding apparatus according to claim 1, wherein the code-amount estimation means selects a code-amount estimation function for each frame.

4. A moving image encoding apparatus according to claim 1, wherein the code-amount allocation means determines the quantization control variable such that the amount of codes for each frame, which is estimated by using the same quantization control variable becomes most suitable for a designated bit rate for an entire sequence of a moving image to be encoded, and allocates an amount of codes for each frame by using the determined quantization control variable.

5. A moving image encoding method which carries out two-step encoding such that the nature of an image to be encoded is analyzed on the basis of results of first-step encoding, and second-step encoding is carried out on the basis of results of the analysis, the method comprising:

a first-step encoding step for executing a plurality of times the first-step encoding by use of different quantization control variables for each frame;

a code-amount estimation step for estimating, for all the quantization control variables, an amount of codes generated for each frame by making use of a plurality of results of the encoding by the first-step encoding step;

a code-amount allocation step for allocating an amount of codes for each frame on the basis of results of the estimation by the code-amount estimation step; and a second-step encoding step for executing the second-step encoding on the basis of the amount of codes allocated to each frame by the code-amount allocation step, wherein the first-step encoding step omits the motion vector detecting process, the de-blocking filter process, the motion compensation prediction process, the inverse quantization process, and the IDCT process contained in the second and subsequent executions of the encoding process for each frame.

6. A moving image encoding method according to claim 5, wherein the first-step encoding step changes the number of times of execution of the encoding in accordance with the attribute of each frame.

7. A moving image encoding method according to claim 6, wherein the code-amount estimation step selects a code-amount estimation function for each frame.

8. A moving image encoding method according to claim 5, wherein the code-amount allocation step determines the quantization control variable such that the amount of codes for each frame, which is estimated by using the same quantization control variable becomes most suitable for a designated bit rate for an entire sequence of a moving image to be encoded, and allocates an amount of codes for each frame by using the determined quantization control variable.

9. A non-transitory computer-readable medium embedded with a program in a moving image encoding apparatus, said program when executed by a processor causing a computer to perform moving image encoding functions comprising:

a first-step encoding step for executing a plurality of times the first-step encoding by use of different quantization control variables for each frame;

a code-amount estimation step for estimating, for all the quantization control variables, an amount of codes generated for each frame by making use of a plurality of results of the encoding by the first-step encoding step;

a code-amount allocation step for allocating an amount of codes for each frame on the basis of results of the estimation by the code-amount estimation step; and a second-step encoding step for executing the second-step encoding on the basis of the amount of codes allocated to each frame by the code-amount allocation step, wherein the first-step encoding step omits the motion vector detecting process, the de-blocking filter process, the motion compensation prediction process, the inverse quantization process, and the IDCT process contained in the second and subsequent executions of the encoding process for each frame.

* * * * *